United States Patent
Lin

(10) Patent No.: US 10,291,113 B2
(45) Date of Patent: May 14, 2019

(54) FLYBACK POWER CONVERTER CIRCUIT AND PRIMARY SIDE CONTROLLER CIRCUIT THEREOF

(71) Applicant: RICHTEK TECHNOLOGY CORPORATION, Zhubei, Hsinchu (TW)

(72) Inventor: Kun-Yu Lin, Hsinchu (TW)

(73) Assignee: RICHTEK TECHNOLOGY CORPORATION, Zhubei, Hsinchu (TW)

(*) Notice: Subject to any disclaimer, the term of this patent is extended or adjusted under 35 U.S.C. 154(b) by 0 days.

(21) Appl. No.: 16/000,066

(22) Filed: Jun. 5, 2018

(65) Prior Publication Data

US 2019/0013737 A1  Jan. 10, 2019

Related U.S. Application Data

(60) Provisional application No. 62/528,930, filed on Jul. 5, 2017.

(30) Foreign Application Priority Data

Nov. 24, 2017 (CN) .......................... 2017 1 1191977

(51) Int. Cl.
  *H02M 3/335* (2006.01)
  *H02M 1/36* (2007.01)
  *H02M 1/00* (2006.01)

(52) U.S. Cl.
  CPC ........... *H02M 1/36* (2013.01); *H02M 3/3353* (2013.01); *H02M 3/33507* (2013.01); *H02M 2001/0003* (2013.01)

(58) Field of Classification Search
  CPC .................................. H02M 1/36; H02M 1/32
  USPC ........................................................... 363/49
  See application file for complete search history.

(56) References Cited

U.S. PATENT DOCUMENTS

| 9,184,653 B2 * | 11/2015 | Eom ........................ H02M 1/32 |
| 2015/0003118 A1 * | 1/2015 | Shin ........................ H02M 1/36 363/21.12 |
| 2017/0005583 A1 | 1/2017 | Choi | |

* cited by examiner

*Primary Examiner* — Nguyen Tran
(74) *Attorney, Agent, or Firm* — Tung & Associates

(57) ABSTRACT

A flyback power converter includes a transformer having a primary winding receiving an input power, a secondary winding generating an output power, and an auxiliary winding generating an auxiliary voltage and providing a supply voltage, a primary side switch controlling the primary winding, a start-up switch coupled to the input voltage and the supply voltage, and a primary side controller supplied by the supply voltage. The primary side controller includes a shared pin coupled to a control terminal of the start-up switch, a start-up circuit for controlling the start-up switch to be conductive through the shared pin when the supply voltage is lower than a threshold, and a signal processing circuit receiving an auxiliary signal related to the auxiliary voltage through the shared pin and operating the flyback power converter accordingly, wherein the shared pin, besides providing a function of controlling the start-up switch, provides another function.

28 Claims, 10 Drawing Sheets

FLYBACK POWER CONVERTER CIRCUIT AND PRIMARY SIDE CONTROLLER CIRCUIT THEREOF

CROSS REFERENCE

The present invention claims priority to U.S. 62/528,930, filed on Jul. 5, 2017, and to CN 201711191977.6, filed on Nov. 24, 2017.

BACKGROUND OF THE INVENTION

Field of Invention

The present invention relates to a flyback power converter circuit; particularly, it relates to a flyback power converter circuit with a multi-function pin which can provide multiple functions. The present invention also relates to a primary side controller circuit for use in the flyback power converter circuit.

Description of Related Art

FIG. 1 shows a prior art flyback power converter circuit (flyback power converter circuit 1) which comprises a transformer 10, a primary side switch N1, a primary side controller circuit 30, and a high-voltage (HV) start-up switch SSU. The auxiliary winding WA generates a controller supply voltage VDD to supply power to the primary side controller 30. During start-up stage wherein the controller supply voltage VDD is lower than a start-up threshold, the HV start-up switch SSU is controlled to be conductive through a pin ASU, so as to conduct the input voltage VIN to charge the supply capacitor CDD directly, such that the controller supply voltage VDD is charged up rapidly to be ready to supply power to the primary side controller 30.

The prior art circuits in FIG. 1 has a drawback that an extra dedicated pin ASU is required to control the HV start-up switch SSU, which leads to higher cost and larger circuit size.

Compared to the prior art in FIG. 1, the present invention is advantageous in using a multi-function pin to control the HV start-up switch SSU for rapid power start-up, while the same multi-function pin can provide another function; thus, the total number of pins is reduce, whereby the cost the circuit size are reduced.

A relevant prior patent is US 2017/0005583 A1, which solves the issue by a different approach from the present invention.

SUMMARY OF THE INVENTION

From one perspective, the present invention provides a flyback power converter circuit, comprising: a transformer, which includes a primary side winding for receiving an input voltage; a secondary side winding for generating an output voltage; and an auxiliary winding for generating an auxiliary voltage and providing a controller supply voltage; a primary side switch, coupled to and configured to control the primary side winding; a high voltage (HV) start-up switch, wherein a current inflow terminal of the HV start-up switch is coupled to an input voltage related signal, and a current outflow terminal of the HV start-up switch is coupled to the controller supply voltage, wherein the input voltage related signal relates to the input voltage; and a primary side controller circuit, which is located at a primary side of the transformer and powered by the controller supply voltage, and is configured to operably generate a switch control signal to control the primary side switch; the primary side controller circuit including: a multi-function pin, which is coupled to a control terminal of the HV start-up switch and is coupled to an auxiliary sensing signal, wherein the auxiliary sensing signal relates to the auxiliary voltage; a high voltage (HV) start-up circuit, coupled to the control terminal of the HV start-up switch through the multi-function pin, wherein when the controller supply voltage does not exceed a start-up voltage threshold, the HV start-up circuit controls the HV start-up switch to be ON, and when the controller supply voltage exceeds the start-up voltage threshold, the HV start-up circuit controls the HV start-up switch to be OFF; and a signal processing circuit, configured to operably receive the auxiliary sensing signal through the multi-function pin, wherein when the controller supply voltage exceeds the start-up voltage threshold, the signal processing circuit operates the flyback power converter circuit according to the auxiliary sensing signal.

In one embodiment, when the controller supply voltage exceeds the start-up voltage threshold, the signal processing circuit performs at least one of the following operations according to the auxiliary sensing signal: (1) sensing the input voltage, (2) sensing the output voltage, (3) regulating the output voltage by feedback control, (4) compensating an output impedance of the flyback power converter circuit, (5) determining an operation mode, and/or (6) determining a conduction time of a secondary side diode.

In one embodiment, the input voltage related signal is directly coupled to the input voltage.

In one embodiment, the flyback power converter circuit of further comprises a rectifier circuit which is configured to operably rectify an AC input signal to generate output voltage, wherein the input voltage related signal is coupled to a positive terminal or a negative terminal of the AC input signal.

In one embodiment, the HV start-up circuit includes: a comparison circuit, configured to operably compare the controller supply voltage and a reference voltage to generate a comparison output signal, wherein the reference voltage has a level relating to the start-up voltage threshold; and a start-up control switch, wherein a current inflow terminal and a current outflow terminal of the start-up control switch is coupled between the controller supply voltage and the multi-function pin, and a control terminal of the start-up control switch is coupled to the comparison output signal, wherein when the controller supply voltage does not exceed the start-up voltage threshold, the start-up control switch is controlled to be ON to turn ON the HV start-up switch, and when the controller supply voltage exceeds the start-up voltage threshold, the start-up control switch is controlled to be OFF to turn OFF the HV start-up switch.

In one embodiment, when the primary side switch is ON, the signal processing circuit obtains information related to the input voltage according to the auxiliary sensing signal.

In one embodiment, the signal processing circuit includes: a current generator circuit, wherein when the primary side switch is ON, the current generator circuit is configured to operably control a voltage on the multi-function pin to be at a predetermined voltage level, and generate an auxiliary sensing current on the multi-function pin according to the auxiliary sensing signal, wherein the auxiliary sensing current relates to the input voltage.

In one embodiment, when the primary side switch is OFF, the signal processing circuit obtains information related to the output voltage according to the auxiliary sensing signal.

In one embodiment, the signal processing circuit regulates the output voltage by feedback control according to the output voltage related information.

In one embodiment, the signal processing circuit includes: a sample-and-hold (S/H) circuit, wherein when the primary side switch is OFF, the S/H circuit samples and holds the auxiliary sensing signal to generate a sample-and-hold signal; an error amplifier circuit, configured to operably generate a feedback compensation signal according to the sample-and-hold signal and a reference voltage; and a modulation circuit, configured to operably modulate the feedback compensation signal to generate the switch control signal to regulate the output voltage by feedback control.

In one embodiment, the signal processing circuit includes: a compensation current generator circuit, configured to operably generate a compensation current on the multi-function pin according to a feedback compensation signal and a predetermined output resistance to adjust the auxiliary voltage, so as to adjust the output voltage to compensate a voltage drop of the output voltage caused by the predetermined output resistance.

In one embodiment, the signal processing circuit determines one of the following operations according to whether the auxiliary sensing signal has a knee point and/or according to a time point of the knee point during an OFF time of the primary side switch: (1) a continuous conduction mode, (2) a discontinuous conduction mode, and (3) a boundary conduction mode.

In one embodiment, when the primary side switch is OFF, the signal processing circuit determines an ON time of a secondary side diode according to a time point of the knee point of the auxiliary sensing signal.

In one embodiment, a voltage range of the auxiliary sensing signal is determined according to a conduction threshold of the HV start-up switch, such that when the controller supply voltage exceeds the start-up voltage threshold, the auxiliary sensing signal controls the HV start-up switch to be OFF.

In one embodiment, when the controller supply voltage exceeds the start-up voltage threshold, the signal processing circuit operates the primary side switch according to the auxiliary sensing signal.

In one embodiment, the flyback power converter circuit further comprises a reverse blocking diode which is coupled in series with the HV start-up switch to prevent a reverse current and/or to reduce a voltage applied on the HV start-up switch.

From another perspective, the present invention provides a primary side controller circuit, configured to operably control a flyback power converter circuit, wherein the flyback power converter circuit includes: a transformer, which includes a primary side winding for receiving an input voltage; a secondary side winding for generating an output voltage; and an auxiliary winding for generating an auxiliary voltage and providing a controller supply voltage; a primary side switch, coupled to and configured to control the primary side winding; and a high voltage (HV) start-up switch, wherein a current inflow terminal of the HV start-up switch is coupled to an input voltage related signal, and a current outflow terminal of the HV start-up switch is coupled to the controller supply voltage, wherein the input voltage related signal relates to the input voltage; the primary side controller circuit being located at a primary side of the transformer and being powered by the controller supply voltage, and being configured to operably generate a switch control signal to control the primary side switch; the primary side controller circuit comprising: a multi-function pin, which is coupled to a control terminal of the HV start-up switch and is coupled to an auxiliary sensing signal, wherein the auxiliary sensing signal relates to the auxiliary voltage; a high voltage (HV) start-up circuit, coupled to the control terminal of the HV start-up switch through the multi-function pin, wherein when the controller supply voltage does not exceed a start-up voltage threshold, the HV start-up circuit controls the HV start-up switch to be ON, and when the controller supply voltage exceeds the start-up voltage threshold, the HV start-up circuit controls the HV start-up switch to be OFF; and a signal processing circuit, configured to operably receive the auxiliary sensing signal through the multi-function pin, wherein when the controller supply voltage exceeds the start-up voltage threshold, the signal processing circuit operates the flyback power converter circuit according to the auxiliary sensing signal.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
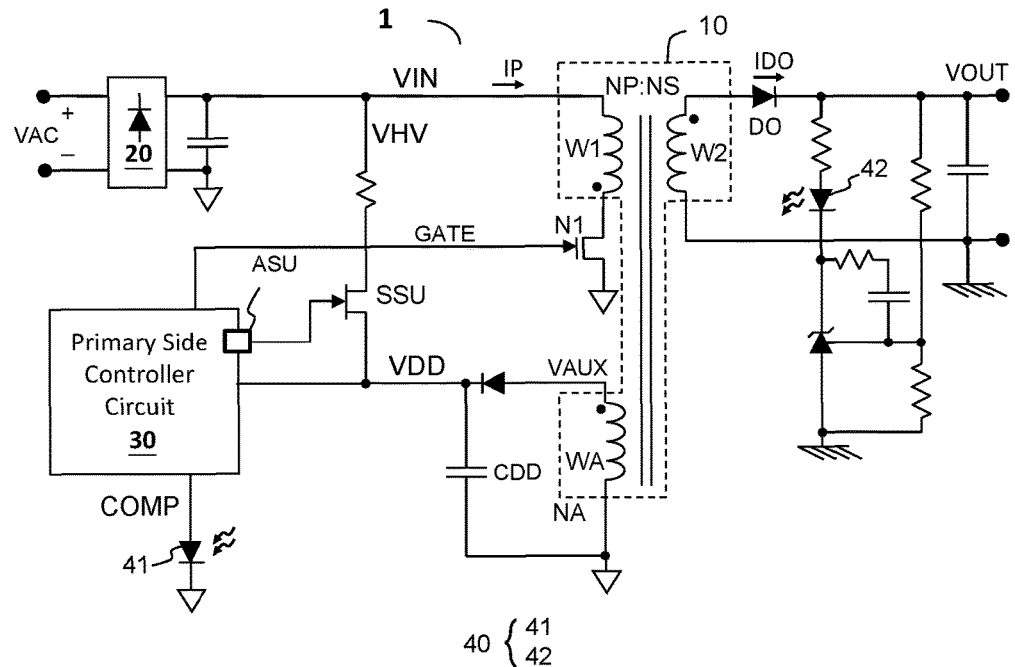
FIG. 1 shows a schematic diagram of a prior art flyback power converter circuit.
Figure 2A:
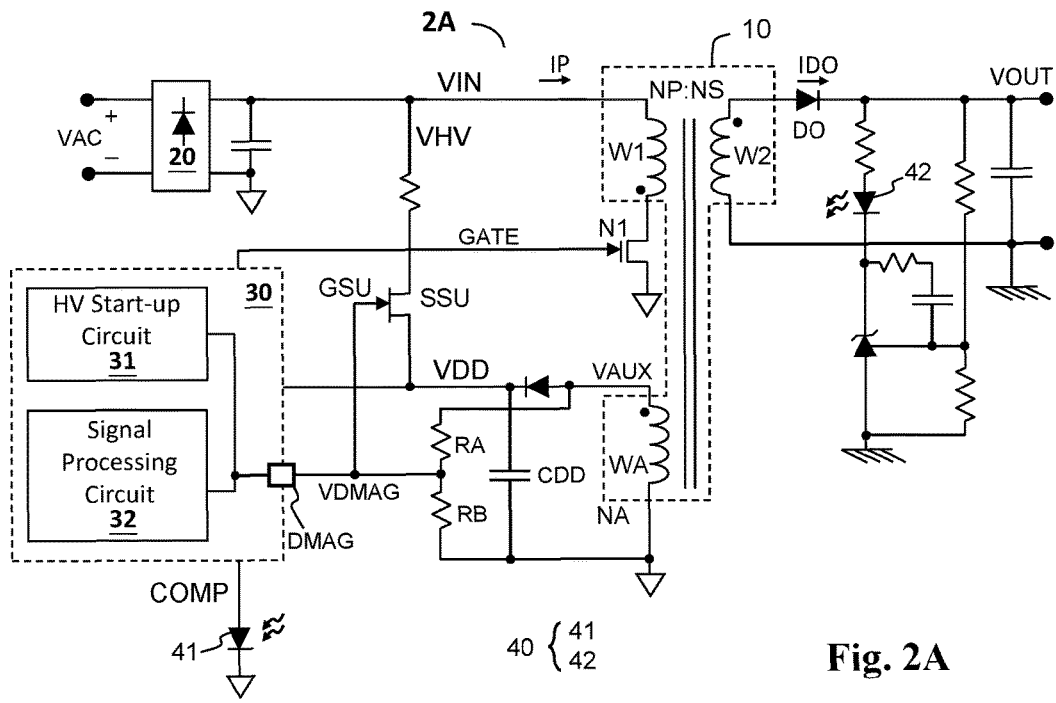
FIGS. 2A-2C show schematic diagrams of embodiments of a flyback power converter circuit and a primary side controller circuit thereof according to the present invention.

FIG. 2A shows one embodiment of the flyback power converter circuit according to the present invention (flyback power converter circuit 2A). The flyback power converter circuit 2A comprises a transformer 10, a primary side switch N1, and a primary side controller circuit 30. The transformer 10 includes a primary side winding W1, a secondary side winding W2, and an auxiliary winding WA. The primary side winding W1 receives an input voltage VIN. The secondary side winding W2 generates an output voltage VOUT. The auxiliary winding WA generates an auxiliary voltage VAUX and provides a controller supply voltage VDD, wherein the controller supply voltage VDD relates to the auxiliary voltage VAUX. In one embodiment, the controller supply voltage VDD is obtained by, for example but not limited to, rectifying, filtering or regulating the auxiliary voltage VAUX. The primary side switch N1 is coupled to the primary side winding W1. The primary side controller circuit 30 is located at a primary side of the transformer 10 and powered by the controller supply voltage VDD, and is configured to operably generate a switch control signal GATE to control the primary side switch N1 which controls the primary side winding W1. In one embodiment, the primary side controller circuit 30 may generate a switch control signal GATE in PWM (pulse width modulation) form according to the feedback compensation signal COMP, to control the primary side switch N1. In one embodiment, the flyback converter circuit 2A may obtain secondary side information through a coupling device 40 for feedback control. In another embodiment, the flyback converter circuit 2A may perform feedback control according to feedback information provided from the primary side, for example the auxiliary sensing signal VDMAG. In this case, the coupling device 40 may be omitted. In one embodiment, the primary side controller circuit 30 may further sense a current related signal to control the primary side switch N1, wherein the current related signal relates to for example but not limited to a primary side winding current, a primary side switch current through the primary side switch N1, or a secondary side winding current.

Figure 2B:
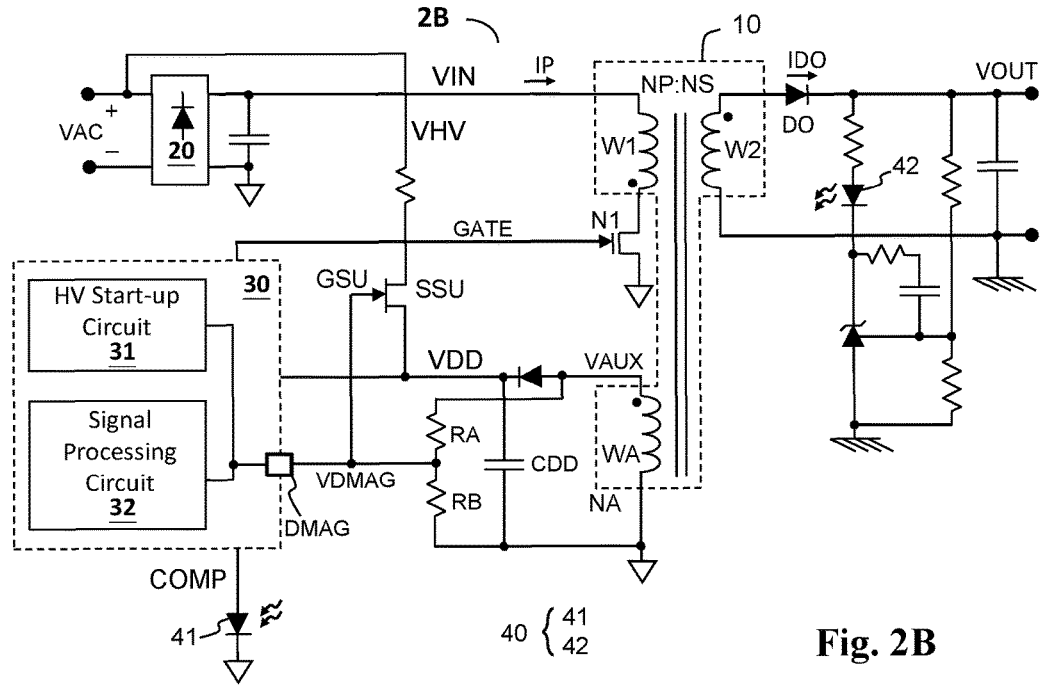
Figure 2C:
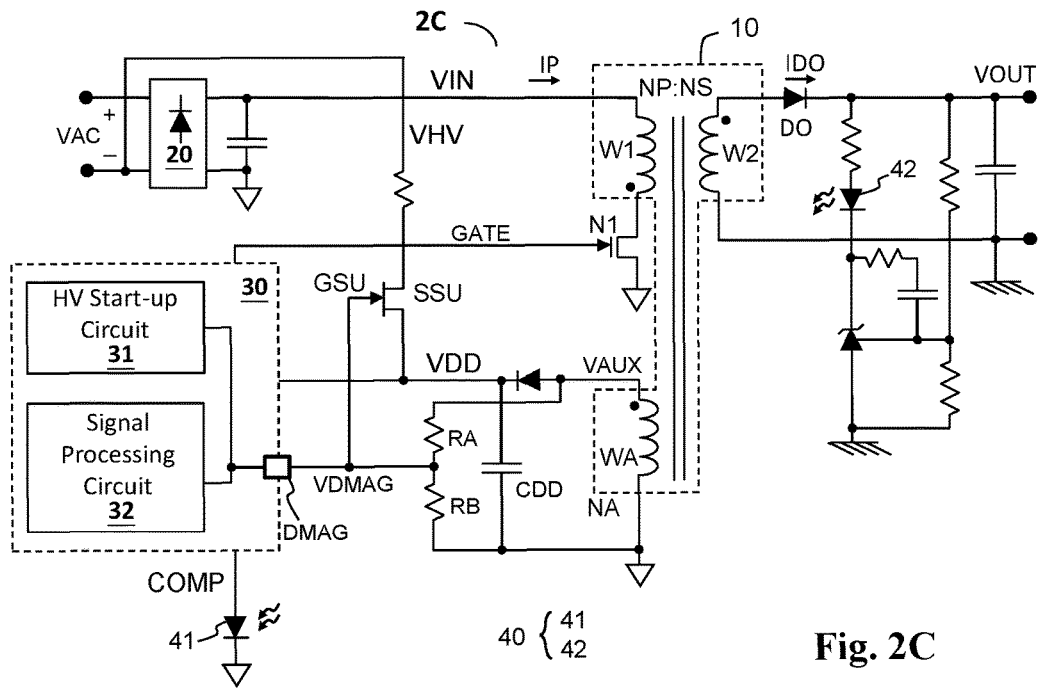
Figure 10A:
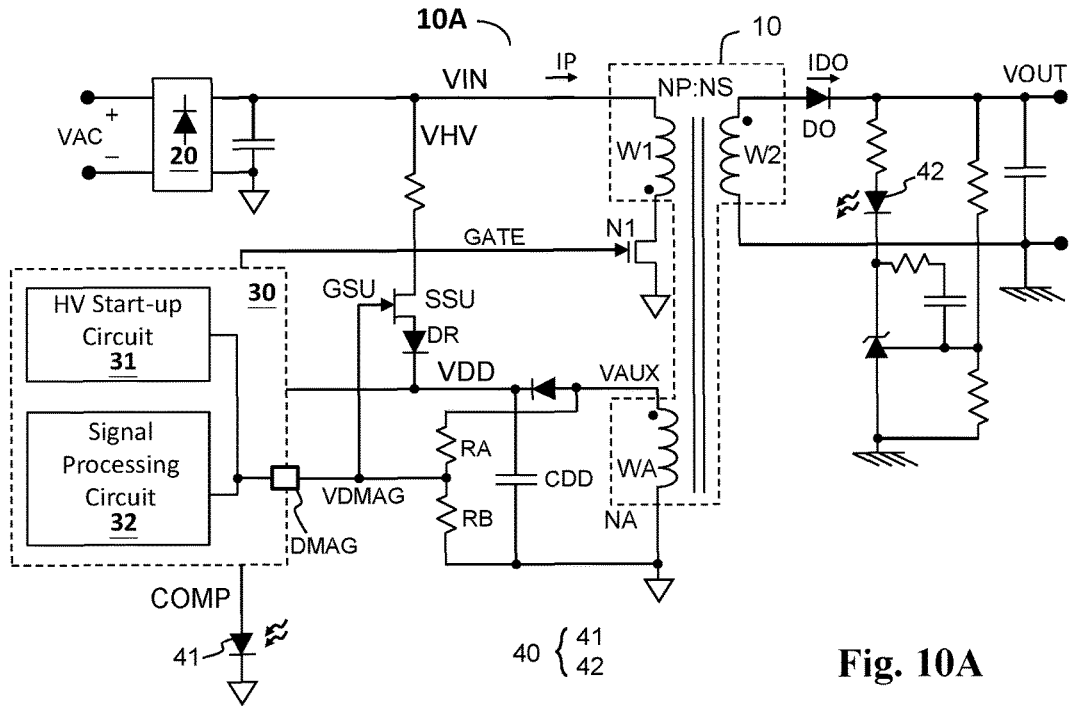
FIGS. 10A-10C show schematic diagrams of embodiments of flyback power converter circuits and primary side controller circuits thereof according to the present invention.
Figure 10B:
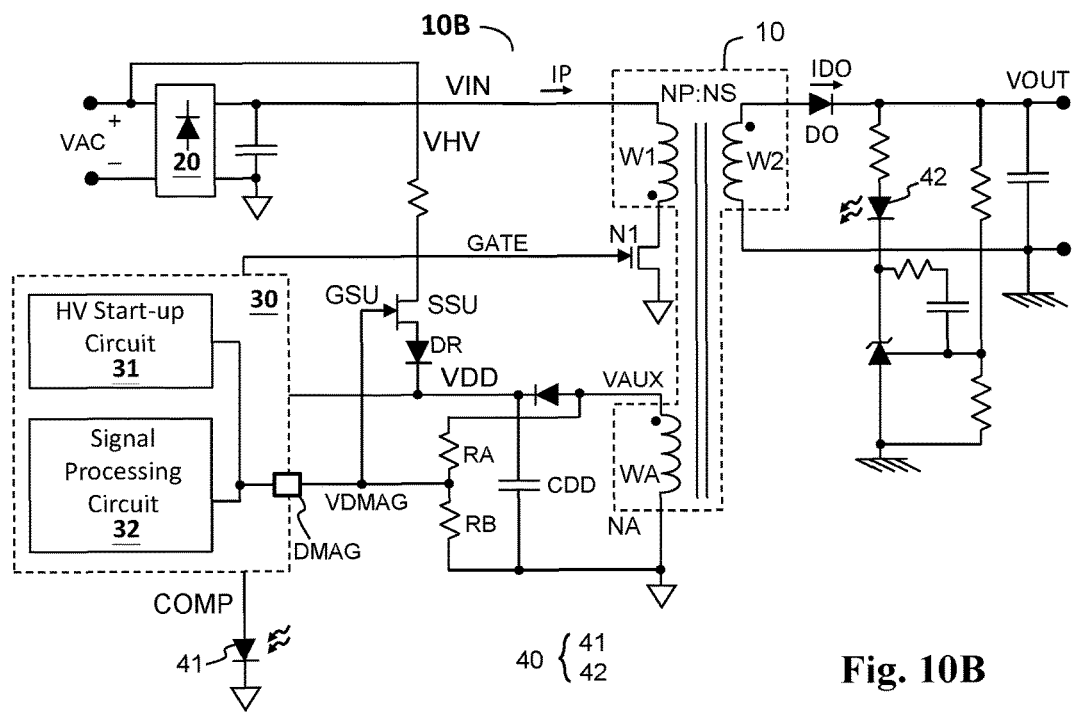
Figure 10C:
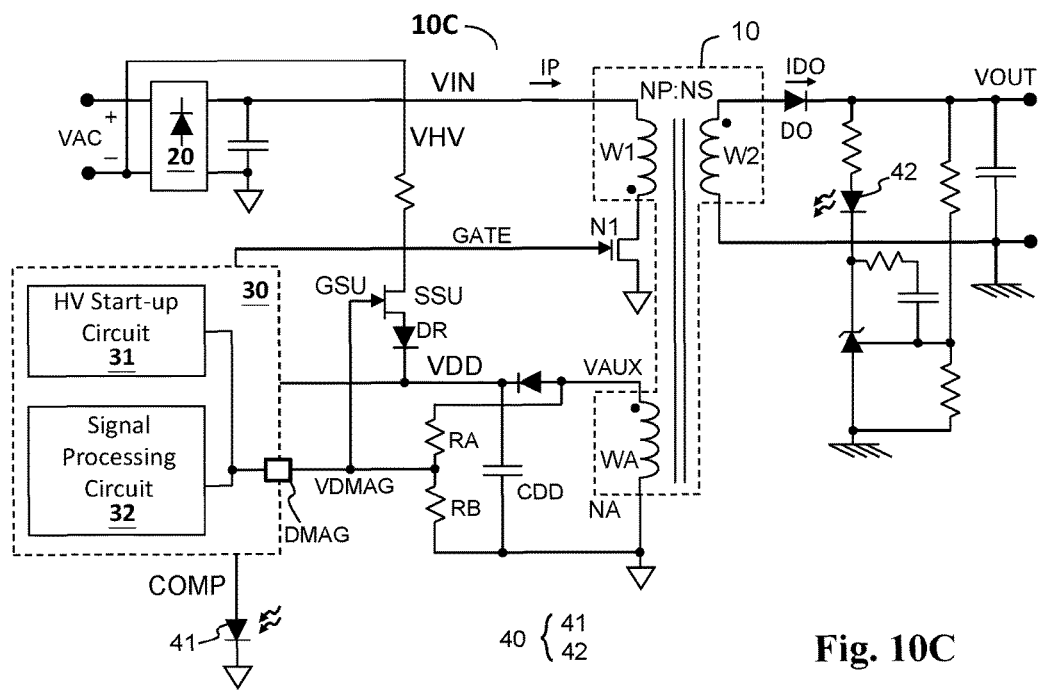

Still referring to FIG. 2A, in one embodiment, a current inflow terminal of the HV start-up switch SSU is coupled to an input voltage related signal VHV, and a current outflow terminal of the HV start-up switch SSU is coupled to the controller supply voltage VDD, wherein the input voltage related signal VHV relates to the input voltage VIN. In one embodiment, as shown in FIG. 2A, the input voltage related signal VHV is directly coupled to the input voltage VIN. Also referring to FIGS. 2B and 2C, in one embodiment, as shown in FIGS. 2B and 2C, the flyback power converter circuit (flyback power converter circuit 2B and 2C) includes a rectifier circuit 20 which rectifies the AC input signal VAC to generate the input voltage VIN, wherein the input voltage related signal VHV is coupled to a positive terminal (as shown in FIG. 2B) or a negative terminal (as shown in FIG. 2C) of the AC input signal VAC. In one embodiment, the HV start-up switch SSU may be for example but not limited a JFET transistor. In one embodiment, the flyback power converter may include a reverse blocking diode (such as DR shown in FIGS. 10A-10C) which is coupled in series with the HV start-up switch, between the input voltage related signal and the current outflow terminal of the HV start-up switch, to prevent a reverse current which flows from the controller supply voltage VDD to the input voltage related signal VHV. In one embodiment, the reverse diode may also reduce the voltage that the HV start-up switch has to withstand (for example when the reverse blocking diode is reverse biased), so that a HV start-up switch SSU with lower voltage specification can be used to reduce cost.

Still referring to FIG. 2A, in one embodiment, the primary side controller circuit 30 includes a multi-function pin DMAG, a high voltage (HV) start-up circuit 31, and a signal processing circuit 32. The multi-function pin DMAG is coupled to a control terminal GSU of the HV start-up switch SSU and is coupled to an auxiliary sensing signal VDMAG, wherein the auxiliary sensing signal VDMAG relates to the auxiliary voltage VAUX. The high voltage (HV) start-up circuit 31 is coupled to the control terminal GSU of the HV start-up switch SSU through the multi-function pin DMAG, wherein when the controller supply voltage VDD does not exceed a start-up voltage threshold VTH (i.e. the controller supply voltage VDD has not reached the normal operating voltage of the primary side controller circuit 30), the HV start-up circuit 31 controls the HV start-up switch SSU to be ON, such that the input voltage VIN can directly charge the supply capacitor CDD so that the controller supply voltage VDD is charged up rapidly to complete the start-up operation. When the controller supply voltage VDD exceeds (e.g. higher in this embodiment) the start-up voltage threshold VTH (i.e. the controller supply voltage VDD has reached the normal operating voltage of the primary side controller circuit 30), the HV start-up circuit 31 controls the HV start-up switch SSU to be OFF.

The signal processing circuit 32 receives the auxiliary sensing signal VDMAG through the multi-function pin DMAG to perform at least one other operation. In this embodiment, the auxiliary sensing signal VDMAG may be a divided voltage of auxiliary voltage VAUX, wherein the divided voltage may be obtained by the voltage divider resistors as shown in the figure. In this embodiment, VDMAG=VAUX*RB/(RA+RB), wherein RA and RB are resistance values of the voltage divider resistors. According to the present invention, when the controller supply voltage VDD exceeds the start-up voltage threshold VTH, the signal processing circuit 32 operates the flyback power converter circuit 2A by for example operating the primary side switch N1 according to the auxiliary sensing signal VDMAG to perform at least one other operation. In one embodiment, when the controller supply voltage VDD exceeds the start-up voltage threshold VTH, the flyback power converter circuit 2A can perform at least one of the following operations by the signal processing circuit 32 according to the auxiliary sensing signal VDMAG: (1) sensing the input voltage VIN, (2) sensing the output voltage VOUT, (3) regulating the output voltage VOUT by feedback control, (4) compensating an output impedance of the flyback power converter circuit, (5) determining an operation mode or control the flyback power converter circuit to operate in a certain operation mode and/or (6) determining a conduction time of a secondary side diode DO. The details will be illustrated with several embodiments as below.

Figure 3:
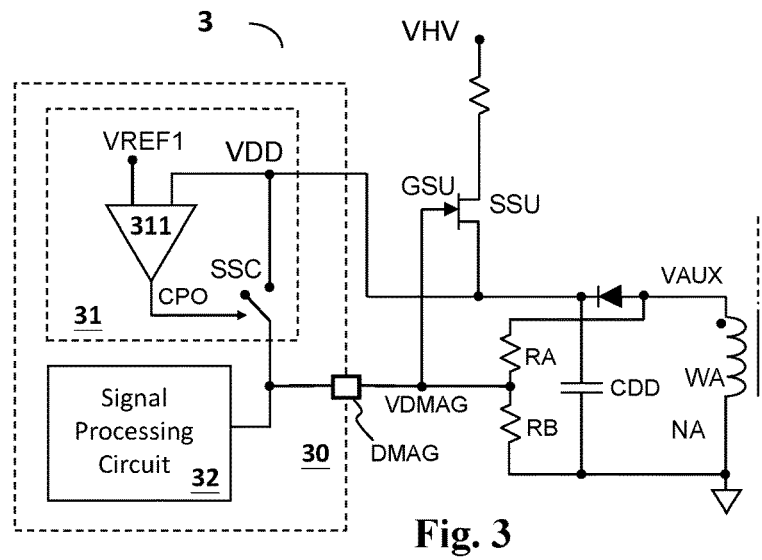
FIG. 3 shows a schematic diagram of an embodiment of a flyback power converter circuit and a HV start-up circuit thereof according to the present invention.

Referring to FIG. 3 which shows a schematic diagram of an embodiment of the flyback power converter circuit and the HV start-up circuit (HV start-up circuit 31) thereof according to the present invention. The HV start-up circuit 31 includes a comparison circuit 311 and a start-up control switch SSC. The comparison circuit 311 is configured to operably compare the controller supply voltage VDD and a reference voltage VREF1 to generate a comparison output signal CPO, wherein the level of the reference voltage VREF1 relates to the start-up voltage threshold VTH. In one embodiment, the reference voltage VREF1 may be equal to or may be a certain multiple/ratio of the start-up voltage threshold VTH. A current inflow terminal and a current outflow terminal of the start-up control switch SSC is coupled between the controller supply voltage VDD and the multi-function pin DMAG, and a control terminal of the start-up control switch SSC is coupled to the comparison output signal CPO. When the controller supply voltage VDD does not exceed the start-up voltage threshold VTH, the start-up control switch SSC is controlled to be ON to turn ON the HV start-up switch SSU, such that the input voltage related voltage VHV (which is for example the input voltage VIN itself) can directly charge the supply capacitor CDD so that the controller supply voltage VDD is charged up rapidly to complete the start-up operation. When the controller supply voltage VDD exceeds the start-up voltage threshold VTH, the start-up control switch SSC is controlled to be OFF to turn OFF the HV start-up switch SSU. In this embodiment, the HV start-up switch SSU is a JFET transistor whose conduction threshold usually is a negative value.

Figure 4:
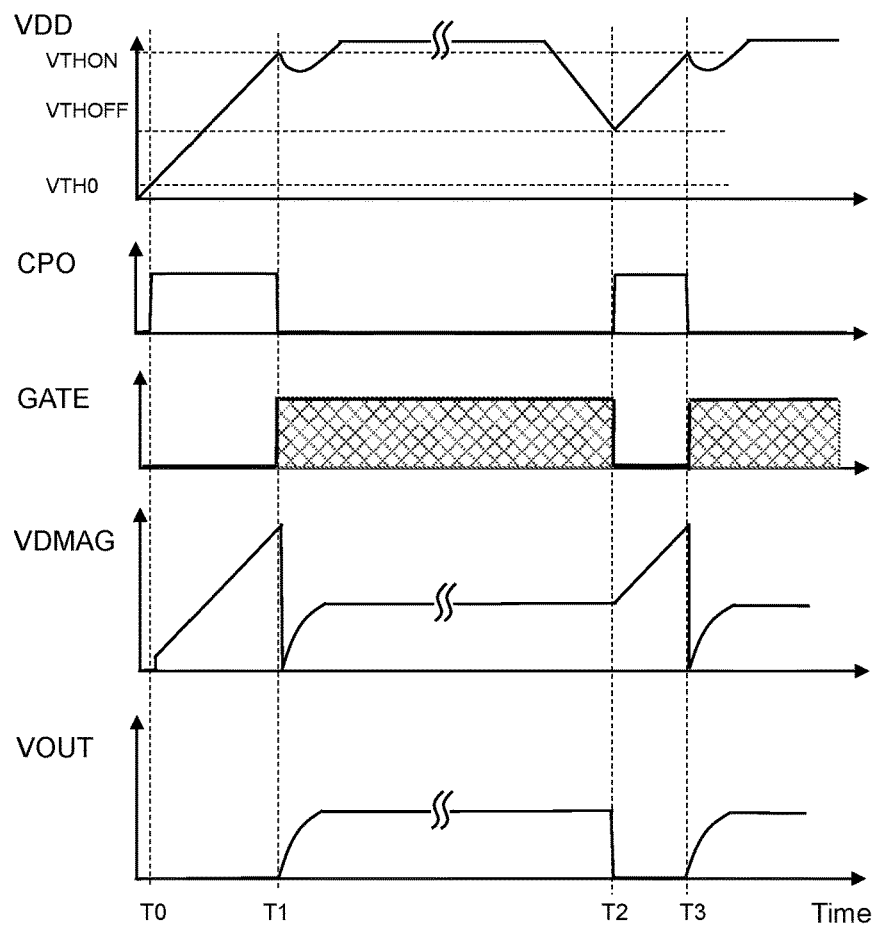
FIG. 4 shows schematic waveforms corresponding to the embodiments of the flyback power converter circuit according to the present invention.

Referring to FIG. 4, FIG. 4 shows schematic waveforms corresponding to the embodiments of the flyback power converter circuit according to the present invention. During power start-up stage (for example T0-T1), the controller supply voltage VDD is lower than the start-up voltage threshold VTH (i.e. VTHON shown in the figure); the start-up control switch SSC is controlled to be ON (CPO is at high level) to turn ON the HV start-up switch SSU. During this period, the voltage on the multi-function pin DMAG (i.e. the auxiliary sensing signal VDMAG) rises as the controller supply voltage VDD rises. When the controller supply voltage VDD reaches the start-up voltage threshold VTH (i.e. T1), the start-up control switch SSC is controlled to be OFF (CPO is at low level) to turn OFF the HV start-up switch SSU. At this time point, since the controller supply voltage VDD has reached the operating voltage level of the primary side controller circuit 30, the primary side controller circuit 30 can start operating the primary side switch N1 (i.e. the signal GATE starts switching with for example PWM so that the output voltage VOUT starts rising, whereby the auxiliary voltage VAUX also starts rising, maintaining the controller supply voltage VDD. Besides, in one embodiment, when the controller supply voltage VDD falls from the normal operating voltage, the start-up voltage threshold VTH may include a hysteresis, i.e., the threshold voltage for the HV start-up switch SSU to be ON again is VTHOFF instead of VTHON, as shown in the figure. In this embodiment, from T2 to T3, the flyback power converter circuit is powered on (starts up) again.

Figure 5:
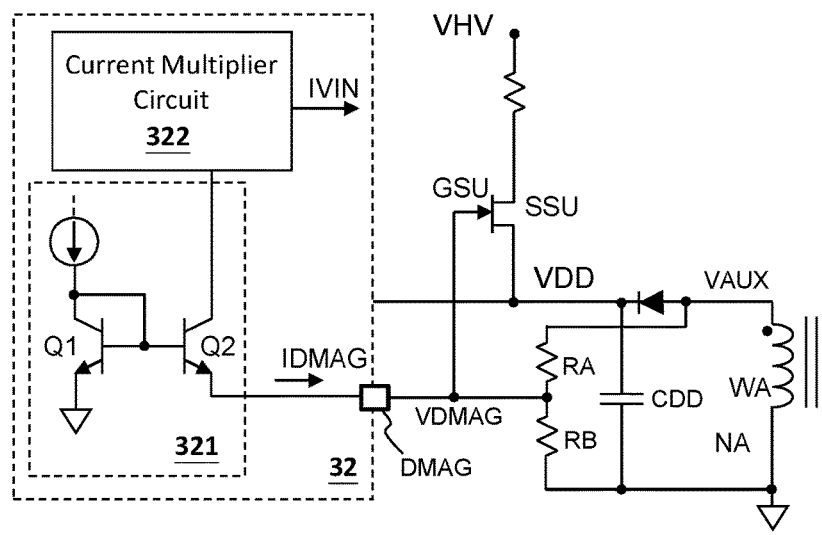
FIG. 5 shows a schematic diagram of an embodiment of a flyback power converter circuit and a signal processing circuit thereof according to the present invention.

In one embodiment, when the primary side switch N1 is ON, the signal processing circuit 32 may acquire information related to the input voltage VIN according to the auxiliary sensing signal VDMAG. Referring to FIG. 5 which shows a schematic diagram of an embodiment of the flyback power converter circuit and the signal processing circuit (signal processing circuit 32) thereof according to the present invention, the signal processing circuit 32 includes a current generator circuit 321 and a current multiplier circuit 322. When the primary side switch N1 is ON, the current generator circuit 321 is configured to operably control a voltage on the multi-function pin DMAG to be substantially at a predetermined voltage level (for example but not limited to 0), and generate an auxiliary sensing current IDMG on the multi-function pin DMAG according to the auxiliary sensing signal VDMAG. In one embodiment, as shown in the figure, the current generator circuit 321 includes a pair of common base transistors (Q1 and Q2), wherein the emitter voltages of the transistors Q1 and Q2 are substantially the same, and both are at ground level in this embodiment. The current multiplier circuit 322 generates the input voltage related current IVIN according to the auxiliary sensing current IDMG, wherein IVIN is related to the input voltage VIN. From one perspective, the auxiliary sensing current IDMG also relates to the input voltage VIN. In one embodiment, the current multiplier circuit 322 may be for example but not limited a current mirror.

Figure 6:
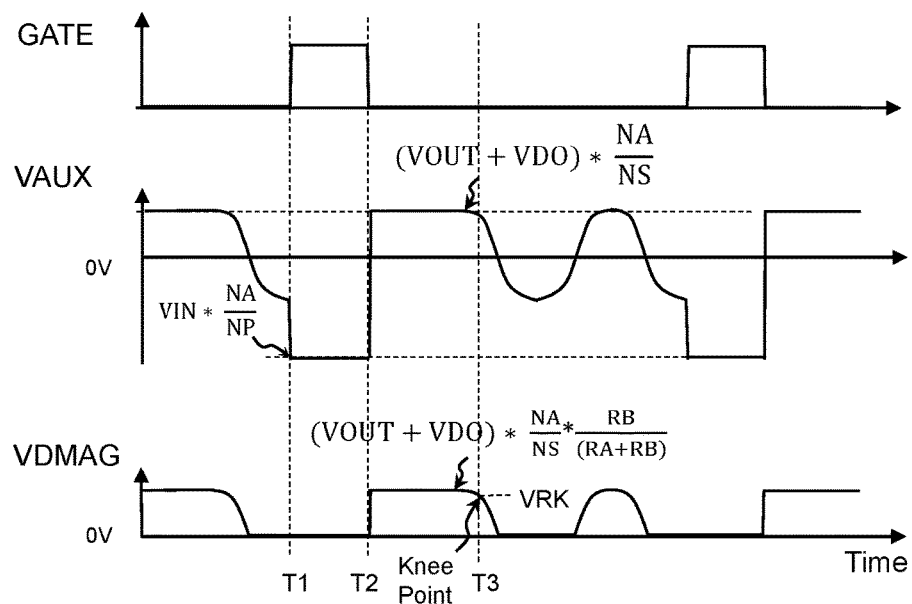
FIG. 6 shows schematic waveforms corresponding to the embodiments of the flyback power converter circuit according to the present invention.

Also referring to FIG. 6 which shows schematic waveforms corresponding to the embodiments of the flyback power converter circuit according to the present invention, when the primary side switch N1 is ON (e.g. T1-T2 in the figure), the auxiliary voltage VAUX can be calculated as below: VAUX=VIN*NA/NP, wherein NA/NP is the turn ratio of the auxiliary winding WA to the primary side winding W1. In the embodiment of FIG. 5, when the primary side switch N1 is ON, the current generator circuit 321 controls the voltage level on the multi-function pin DMAG (i.e. the auxiliary sensing signal VDMAG) to be substantially 0, and therefore the auxiliary sensing current IDMG can be calculated as below: IDMG=(VDAMG−VAUX)/RA=(VIN*NA/NP)/RA. In this embodiment, the current multiplier circuit 322 generates the input voltage related current IVIN by multiplying the auxiliary sensing current IDMG by K (a real number), that is, IVIN=K*IDMG. Hence, in this embodiment, the input related current IVIN is proportional to the input voltage VIN. In one embodiment, the flyback power converter circuit of the present invention can operate according to the information related to the input voltage VIN (for example the input voltage related current IVIN).

In one embodiment, when the primary side switch N1 is OFF, the signal processing circuit 32 may acquire information related to the output voltage VOUT according to the auxiliary sensing signal VDMAG. Still referring to FIG. 6, when the primary side switch N1 is OFF (e.g. T2-T3 in the figure), the level of the auxiliary voltage VAUX is expressed as VAUX=(VOUT+VDO)*NA/NS, wherein NA/NS is the turn ratio of the auxiliary winding WA to the secondary winding W2, and VDO indicates the forward voltage of the secondary side diode DO. Note that the auxiliary sensing signal VDMAG is a division of the auxiliary voltage VAUX, i.e. VDMAG=VAUX*RB/(RA+RB). In other words, the flyback power converter circuit of the present invention can acquire information related to the output voltage VOUT according to the auxiliary sensing signal VDMAG. In one embodiment, the flyback power converter circuit of the present invention can operate according to the information related to the output voltage VOUT (for example the auxiliary sensing signal VDMAG).

Figure 7:
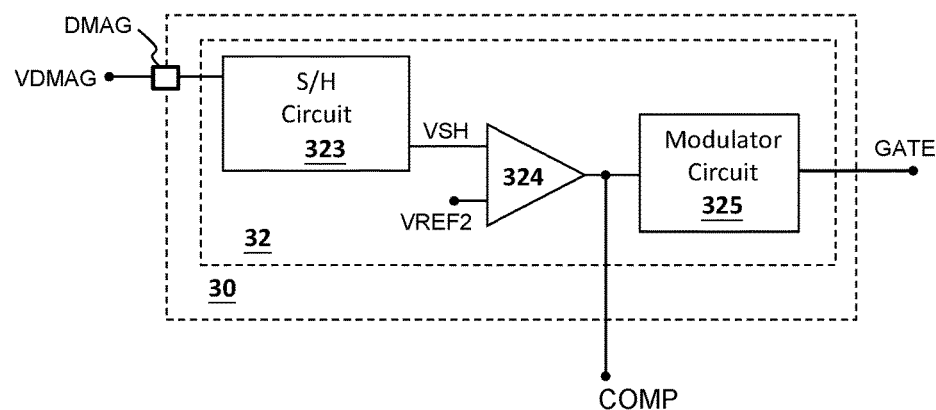
FIG. 7 shows a schematic diagram of an embodiment of a flyback power converter circuit and a signal processing circuit thereof according to the present invention.

In one embodiment, the flyback power converter circuit of the present invention can regulate the output voltage VOUT by feedback control according to the information related to the output voltage VOUT (i.e. through the auxiliary sensing signal VDMAG). FIG. 7 shows a schematic diagram of the signal processing circuit (signal processing circuit 32) according to the present invention. In this embodiment, the signal processing circuit 32 includes a sample-and-hold (S/H) circuit 323, an error amplifier circuit 324, and a modulation circuit 325. When the primary side switch is OFF, the S/H circuit 323 samples and holds the auxiliary sensing signal VDMAG to generate a sample-and-hold signal VSH. The error amplifier circuit 324 is configured to operably generate a feedback compensation signal COMP according to the sample-and-hold signal VSH and a reference voltage VREF2. The modulation circuit 325 modulates the feedback compensation signal COMP to generate the switch control signal GATE to regulate the output voltage VOUT by feedback control, wherein the modulation scheme may be for example but not limited to PWM (pulse-width modulation).

Figure 8:
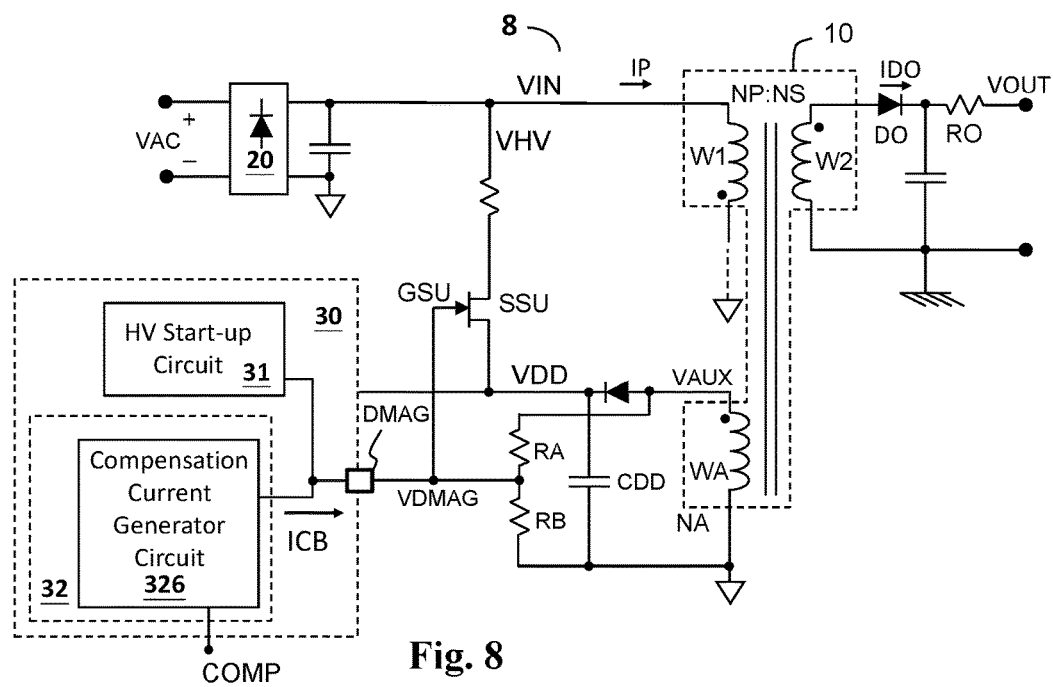
FIG. 8 shows a schematic diagram of an embodiment of a flyback power converter circuit and a signal processing circuit thereof according to the present invention.

FIG. 8 shows a schematic diagram of an embodiment of the signal processing circuit (signal processing circuit 32) according to the present invention. In this embodiment, the signal processing circuit 32 includes a compensation current generator circuit 326 which is configured to operably generate a compensation current ICB on the multi-function pin DMAG according to a feedback compensation signal COMP and a predetermined output resistance RO to adjust the auxiliary voltage VAUX, so as to adjust the output voltage VOUT to achieve output impedance compensation. The feedback compensation signal COMP may be generated by the aforementioned error amplifier circuit 324. The output resistance RO may include a parasitic resistance on the power transmission path, for example the resistance caused by the cable and/or connectors. The voltage drop of the output voltage VOUT caused by the predetermined output resistance RO can be compensated by the compensation current ICB. In one embodiment, the output resistance RO is a known value.

Figure 9A:
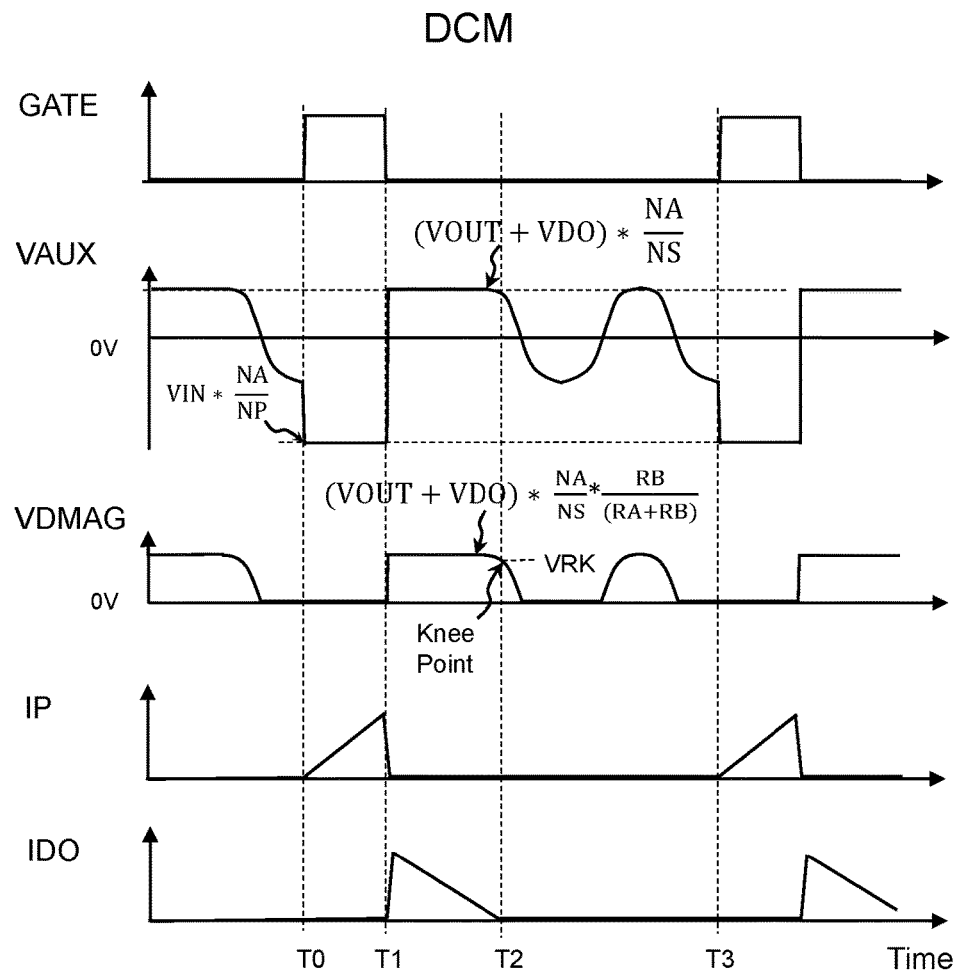
FIGS. 9A-9C show schematic waveforms corresponding to the embodiments of the flyback power converter circuit according to the present invention.
Figure 9B:
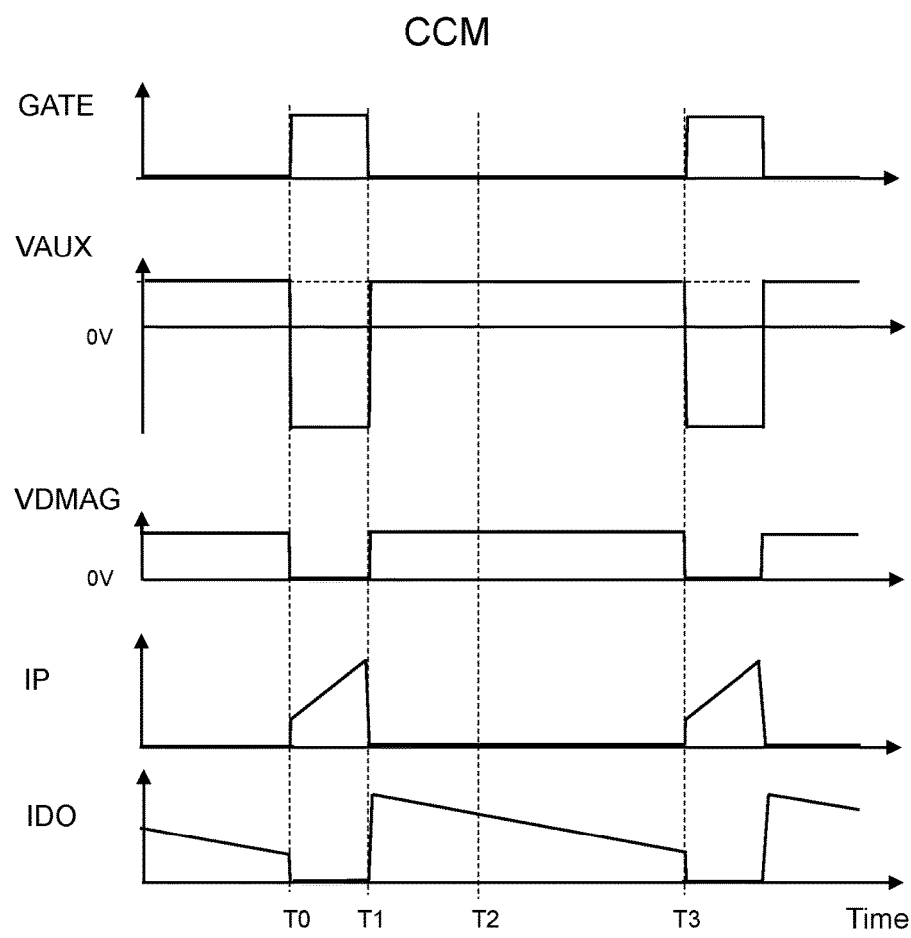
Figure 9C:
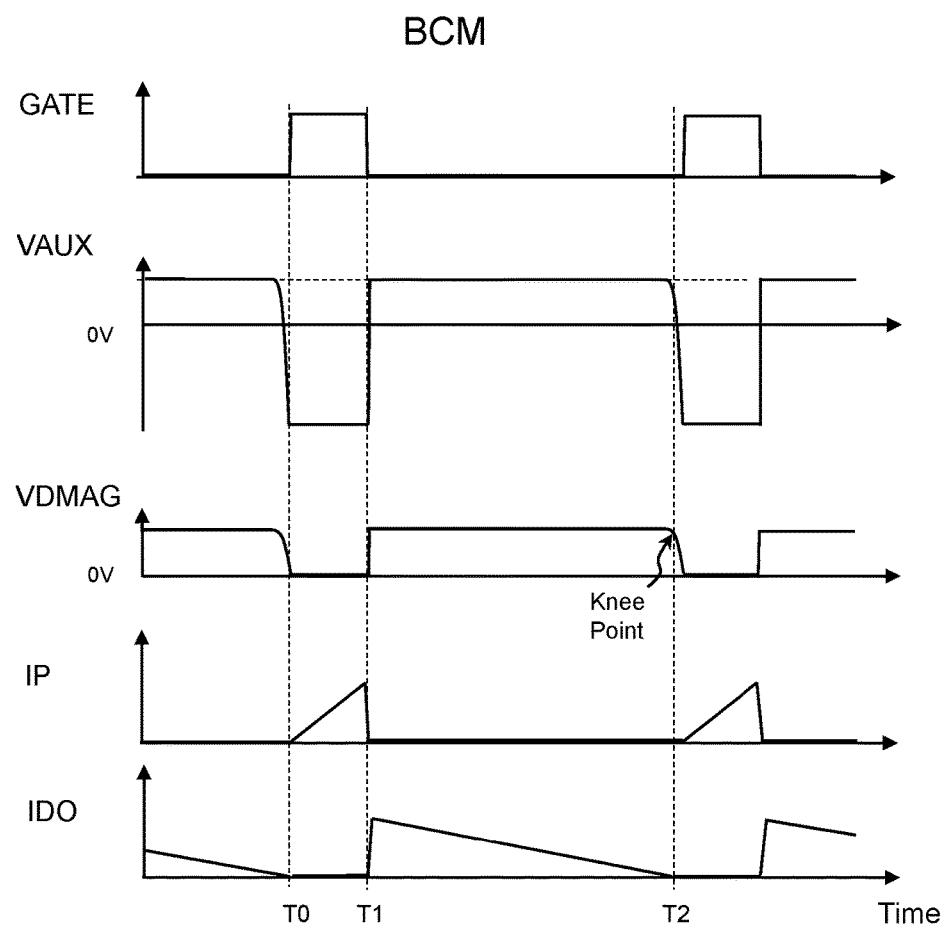

FIGS. 9A-9C show schematic waveforms corresponding to the embodiments of the flyback power converter circuit according to the present invention. As shown in the figure, when the primary side switch N1 is OFF, the signal processing circuit (such as the signal processing circuit 32 shown in FIG. 2A) determines an ON time of a secondary side diode DO according to a time point of the knee point of the auxiliary sensing signal VDMAG. In FIG. 9A, during the OFF time of the primary side switch N1 (such as T1-T3), the auxiliary sensing signal VDMAG has a knee point, that is, as shown in the figure, at time point T2 when the auxiliary sensing signal VDMAG turns and falls to below a reference threshold VRK. At this time point, it can be determined that the secondary side diode DO is OFF. As shown by the current IDO of the secondary side diode DO the in FIG. 9A, the ON time of the secondary side diode DO is T1-T2. From another perspective, it indicates that the flyback power converter circuit operates in DCM (discontinuous conduction mode) in this embodiment.

On the other hand, as shown in FIG. 9B, during the OFF time of the primary side switch N1 (such as T1-T3 in FIG. 9B), the auxiliary sensing signal VDMAG does not include a knee point, which indicates that, in this embodiment, the ON time of the secondary side diode DO is equal to the OFF time of the primary side switch N1 and the flyback power converter circuit operates in CCM (continuous conduction mode). As another embodiment as shown in FIG. 9C, during the OFF time of the primary side switch N1 (such as T1-T3 in FIG. 9C), the knee point of the auxiliary sensing signal VDMAG happens right before the primary side switch N1 is going to be ON for the next cycle (i.e. as shown in FIG. 9C, the knee point T2 coincides with T3 when the OFF time of the primary side switch N1 ends), which indicates that the flyback power converter circuit operates in BCM (boundary conduction mode) in this embodiment. In one embodiment, the flyback power converter circuit can be controlled to operate in a desired conduction mode according to the above information, such as by adjusting the frequency of the flyback power converter circuit according to the above information.

As described earlier in the text, the flyback power converter circuit can control the HV start-up switch SSU to charge up the controller supply voltage VDD rapidly through the multi-function pin DMAG during power start-up stage, and can perform various functions as described above with the same multi-function pin DMAG after the power start-up stage, whereby the cost and circuit size can be reduced. After the power start-up is finished, the voltage on the multi-function pin DMAG (i.e. the auxiliary sensing signal VDMAG) should be ensured not to turn ON the HV start-up switch SSU. In one embodiment, the voltage range of the auxiliary sensing signal VDMAG is determined according to a conduction threshold of the HV start-up switch SSU. As an example, in the embodiment shown in FIG. 2A, the ratio of the division resistance RA and RB may be determined by the conduction threshold of the HV start-up switch SSU, such that the voltage range of the auxiliary sensing signal VDMAG is ensured not to turn ON the HV start-up switch SSU. Note that according to the present invention, since the multi-function pin DMAG operates with the auxiliary sensing signal VDMAG which relates to the auxiliary voltage VAUX, and the auxiliary sensing signal VDMAG also relates to the controller supply voltage VDD, when the voltage range of the auxiliary sensing signal VDMAG is determined according to the conduction threshold of the HV start-up switch SSU, the gate voltage and the source voltage of the HV start-up switch SSU can keep a certain relationship, and thus advantageously, the flyback power converter circuit does not need other devices such as a clamping circuit to ensure not to turn ON the HV start-up switch SSU.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. As an example, the "sensing the input voltage VIN" and the "sensing the output voltage VOUT" can be used together. In this case, these two functions can be performed according to the auxiliary sensing signal VDMAG during the ON time and OFF time of the primary side switch N1 respectively, in addition to the rapid start-up function through the same multi-function pin DMAG. As another example, during the OFF time of the primary side switch N1, any two or more of "sensing the output voltage VOUT", "regulating the output voltage VOUT by feedback control", "output impedance compensation", "determining an operation mode" and "determining the ON time of the secondary side diode DO" can be performed together, such that the flyback power converter circuit can operate with two or more of these functions in addition to the rapid start-up function through the same multi-function pin DMAG. Furthermore, those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:
1. A flyback power converter circuit, comprising:
 a transformer, which includes a primary side winding for receiving an input voltage; a secondary side winding for generating an output voltage; and an auxiliary winding for generating an auxiliary voltage and pro- viding a controller supply voltage, wherein the controller supply voltage is obtained by rectifying and filtering the auxiliary voltage;

a primary side switch, coupled to and configured to control the primary side winding;

a high voltage (HV) start-up switch, wherein a current inflow terminal of the HV start-up switch is coupled to an input voltage related signal, and a current outflow terminal of the HV start-up switch is coupled to the controller supply voltage, wherein the input voltage related signal relates to the input voltage; and a primary side controller circuit, which is located at a primary side of the transformer and powered by the controller supply voltage, and is configured to operably generate a switch control signal to control the primary side switch; the primary side controller circuit including:

a multi-function pin, which is coupled to a control terminal of the HV start-up switch and receives an auxiliary sensing signal, wherein the auxiliary sensing signal is a divided voltage of the auxiliary voltage;

a high voltage (HV) start-up circuit, coupled to the control terminal of the HV start-up switch through the multi-function pin, wherein when the controller supply voltage does not exceed a start-up voltage threshold, the HV start-up circuit controls a voltage on the multi-function pin to control the HV start-up switch to be ON, and when the controller supply voltage exceeds the start-up voltage threshold, the HV start-up circuit controls the voltage on the multi-function pin to control the HV start-up switch to be OFF; and a signal processing circuit, configured to operably receive the auxiliary sensing signal through the multi-function pin, wherein when the controller supply voltage exceeds the start-up voltage threshold, the signal processing circuit operates the flyback power converter circuit according to the auxiliary sensing signal.

2. The flyback power converter circuit of claim 1, further comprising a reverse blocking diode which is coupled in series with the HV start-up switch to prevent a reverse current and/or to reduce a voltage applied on the HV start-up switch.

3. The flyback power converter circuit of claim 1, wherein when the controller supply voltage exceeds the start-up voltage threshold, the signal processing circuit performs at least one of the following operations according to the auxiliary sensing signal:

(1) sensing the input voltage,
(2) sensing the output voltage,
(3) regulating the output voltage by feedback control,
(4) compensating an output impedance of the flyback power converter circuit,
(5) determining an operation mode, and/or
(6) determining a conduction time of a secondary side diode.

4. The flyback power converter circuit of claim 1, wherein the input voltage related signal is directly coupled to the input voltage.

5. The flyback power converter circuit of claim 1, further comprising a rectifier circuit which is configured to operably rectify an AC input signal to generate the output voltage, wherein the input voltage related signal is coupled to a positive terminal or a negative terminal of the AC input signal.

6. The flyback power converter circuit of claim 1, wherein the HV start-up circuit includes:

a comparison circuit, configured to operably compare the controller supply voltage and a reference voltage to generate a comparison output signal, wherein the reference voltage has a level relating to the start-up voltage threshold; and a start-up control switch, wherein a current inflow terminal and a current outflow terminal of the start-up control switch are coupled between the controller supply voltage and the multi-function pin, and a control terminal of the start-up control switch is coupled to the comparison output signal, wherein when the controller supply voltage does not exceed the start-up voltage threshold, the start-up control switch is controlled to be ON to turn ON the HV start-up switch, and when the controller supply voltage exceeds the start-up voltage threshold, the start-up control switch is controlled to be OFF to turn OFF the HV start-up switch.

7. The flyback power converter circuit of claim 1, wherein when the primary side switch is ON, the signal processing circuit obtains information related to the input voltage according to the auxiliary sensing signal.

8. The flyback power converter circuit of claim 7, wherein the signal processing circuit includes:

a current generator circuit, wherein when the primary side switch is ON, the current generator circuit is configured to operably control a voltage on the multi-function pin to be at a predetermined voltage level, and generate an auxiliary sensing current on the multi-function pin according to the auxiliary sensing signal, wherein the auxiliary sensing current relates to the input voltage.

9. The flyback power converter circuit of claim 1, wherein when the primary side switch is OFF, the signal processing circuit obtains information related to the output voltage according to the auxiliary sensing signal.

10. The flyback power converter circuit of claim 9, wherein the signal processing circuit regulates the output voltage by feedback control according to the information related to the output voltage.

11. The flyback power converter circuit of claim 10, wherein the signal processing circuit includes:

a sample-and-hold (S/H) circuit, wherein when the primary side switch is OFF, the S/H circuit samples and holds the auxiliary sensing signal to generate a sample-and-hold signal;

an error amplifier circuit, configured to operably generate a feedback compensation signal according to the sample-and-hold signal and a reference voltage; and a modulation circuit, configured to operably modulate the feedback compensation signal to generate the switch control signal to regulate the output voltage by feedback control.

12. The flyback power converter circuit of claim 1, wherein the signal processing circuit includes:

a compensation current generator circuit, configured to operably generate a compensation current on the multi-function pin according to a feedback compensation signal and a predetermined output resistance to adjust the auxiliary voltage, so as to adjust the output voltage to compensate a voltage drop of the output voltage caused by the predetermined output resistance.

13. The flyback power converter circuit of claim 1, wherein the signal processing circuit determines one of the following operations according to whether the auxiliary sensing signal has a knee point and/or according to a time point of the knee point during an OFF time of the primary side switch: (1) a continuous conduction mode, (2) a discontinuous conduction mode, and (3) a boundary conduction mode.

14. The flyback power converter circuit of claim 1, wherein when the primary side switch is OFF, the signal processing circuit determines an ON time of a secondary side diode according to a time point of the knee point of the auxiliary sensing signal.

15. The flyback power converter circuit of claim 1, wherein a voltage range of the auxiliary sensing signal is determined according to a conduction threshold of the HV start-up switch, such that when the controller supply voltage exceeds the start-up voltage threshold, the auxiliary sensing signal controls the HV start-up switch to be OFF.

16. The flyback power converter circuit of claim 1, wherein when the controller supply voltage exceeds the start-up voltage threshold, the signal processing circuit operates the primary side switch according to the auxiliary sensing signal.

17. A primary side controller circuit, configured to operably control a flyback power converter circuit, wherein the flyback power converter circuit includes: a transformer, which includes a primary side winding for receiving an input voltage; a secondary side winding for generating an output voltage; and an auxiliary winding for generating an auxiliary voltage and providing a controller supply voltage, wherein the controller supply voltage is obtained by rectifying and filtering the auxiliary voltage; a primary side switch, coupled to and configured to control the primary side winding; and a high voltage (HV) start-up switch, wherein a current inflow terminal of the HV start-up switch is coupled to an input voltage related signal, and a current outflow terminal of the HV start-up switch is coupled to the controller supply voltage, wherein the input voltage related signal relates to the input voltage; the primary side controller circuit being located at a primary side of the transformer and powered by the controller supply voltage, and the primary side controller circuit being configured to operably generate a switch control signal to control the primary side switch; the primary side controller circuit comprising:
  a multi-function pin, which is coupled to a control terminal of the HV start-up switch and receives an auxiliary sensing signal, wherein the auxiliary sensing signal is a divided voltage of the auxiliary voltage;
  a high voltage (HV) start-up circuit, coupled to the control terminal of the HV start-up switch through the multi-function pin, wherein when the controller supply voltage does not exceed a start-up voltage threshold, the HV start-up circuit controls a voltage on the multi-function pin to control the HV start-up switch to be ON, and when the controller supply voltage exceeds the start-up voltage threshold, the HV start-up circuit controls the voltage on the multi-function pin to control the HV start-up switch to be OFF; and
  a signal processing circuit, configured to operably receive the auxiliary sensing signal through the multi-function pin, wherein when the controller supply voltage exceeds the start-up voltage threshold, the signal processing circuit operates the flyback power converter circuit according to the auxiliary sensing signal.

18. The primary side controller circuit of claim 17, wherein when the controller supply voltage exceeds the start-up voltage threshold, the signal processing circuit performs at least one of the following operations according to the auxiliary sensing signal:
  (1) sensing the input voltage,
  (2) sensing the output voltage,
  (3) regulating the output voltage by feedback control,
  (4) compensating an output impedance of the flyback power converter circuit,
  (5) determining an operation mode, and/or
  (6) determining a conduction time of a secondary side diode.

19. The primary side controller circuit of claim 17, wherein the HV start-up circuit includes:
  a comparison circuit, configured to operably compare the controller supply voltage and a reference voltage to generate a comparison output signal, wherein the reference voltage has a level relating to the start-up voltage threshold; and
  a start-up control switch, wherein a current inflow terminal and a current outflow terminal of the start-up control switch are coupled between the controller supply voltage and the multi-function pin, and a control terminal of the start-up control switch is coupled to the comparison output signal, wherein when the controller supply voltage does not exceed the start-up voltage threshold, the start-up control switch is controlled to be ON to turn ON the HV start-up switch, and when the controller supply voltage exceeds the start-up voltage threshold, the start-up control switch is controlled to be OFF to turn OFF the HV start-up switch.

20. The primary side controller circuit of claim 17, wherein when the primary side switch is ON, the signal processing circuit obtains information related to the input voltage according to the auxiliary sensing signal.

21. The primary side controller circuit of claim 20, wherein the signal processing circuit includes:
  a current generator circuit, wherein when the primary side switch is ON, the current generator circuit is configured to operably control a voltage on the multi-function pin to be at a predetermined voltage level, and generate an auxiliary sensing current on the multi-function pin according to the auxiliary sensing signal, wherein the auxiliary sensing current relates to the input voltage.

22. The primary side controller circuit of claim 17, wherein when the primary side switch is OFF, the signal processing circuit obtains information related to the output voltage according to the auxiliary sensing signal.

23. The primary side controller circuit of claim 22, wherein the signal processing circuit regulates the output voltage by feedback control according to the information related to the output voltage.

24. The primary side controller circuit of claim 23, wherein the signal processing circuit includes:
  a sample-and-hold (S/H) circuit, wherein when the primary side switch is OFF, the S/H circuit samples and holds the auxiliary sensing signal to generate a sample-and-hold signal;
  an error amplifier circuit, configured to operably generate a feedback compensation signal according to the sample-and-hold signal and a reference voltage; and
  a modulation circuit, configured to operably modulate the feedback compensation signal to generate the switch control signal to regulate the output voltage by feedback control.

25. The primary side controller circuit of claim 17, wherein the signal processing circuit includes:
  a compensation current generator circuit, configured to operably generate a compensation current on the multi-function pin according to a feedback compensation signal and a predetermined output resistance to adjust the auxiliary voltage, so as to adjust the output voltage to compensate a voltage drop of the output voltage caused by the predetermined output resistance.

26. The primary side controller circuit of claim 17, wherein the signal processing circuit determines one of the following operations according to whether the auxiliary sensing signal has a knee point and/or according to a time point of the knee point during an OFF time of the primary side switch: (1) a continuous conduction mode, (2) a discontinuous conduction mode, and (3) a boundary conduction mode.

27. The primary side controller circuit of claim 17, wherein when the primary side switch is OFF, the signal processing circuit determines an ON time of a secondary side diode according to a time point of the knee point of the auxiliary sensing signal.

28. The primary side controller circuit of claim 17, wherein when the controller supply voltage exceeds the start-up voltage threshold, the signal processing circuit operates the primary side switch according to the auxiliary sensing signal.

* * * * *